(12) United States Patent
Van Dan Elzen

(10) Patent No.: US 10,819,943 B2
(45) Date of Patent: Oct. 27, 2020

(54) VEHICLE VISION SYSTEM WITH INCIDENT RECORDING FUNCTION

(71) Applicant: MAGNA ELECTRONICS INC., Auburn Hills, MI (US)

(72) Inventor: Christopher L. Van Dan Elzen, Rochester, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 703 days.

(21) Appl. No.: 15/147,300

(22) Filed: May 5, 2016

(65) Prior Publication Data

US 2016/0325681 A1 Nov. 10, 2016

Related U.S. Application Data

(60) Provisional application No. 62/241,446, filed on Oct. 14, 2015, provisional application No. 62/240,773, filed on Oct. 13, 2015, provisional application No. 62/158,140, filed on May 7, 2015.

(51) Int. Cl.
*H04N 5/232* (2006.01)
*H04N 5/77* (2006.01)
*H04N 7/18* (2006.01)
*G10L 15/22* (2006.01)

(52) U.S. Cl.
CPC ........... *H04N 5/77* (2013.01); *H04N 5/23203* (2013.01); *H04N 5/23241* (2013.01)

(58) Field of Classification Search
CPC ...... G07C 5/0866; G07C 5/008; G07C 5/085; G07C 5/0891; G07C 2209/10; G07C 5/0875; H04N 7/188; H04N 7/183; H04N 5/23222; H04N 5/23229; H04N 5/772; H04N 5/907; H04N 5/917; H04N 7/181; H04N 5/232; H04N 5/765; B60R 1/00; G08G 1/205
See application file for complete search history.

(56) References Cited

U.S. PATENT DOCUMENTS

| | | |
|---|---|---|
| 4,987,357 A | 1/1991 | Masaki |
| 5,001,558 A | 3/1991 | Burley et al. |
| 5,003,288 A | 3/1991 | Wilhelm |
| 5,012,082 A | 4/1991 | Watanabe |
| 5,016,977 A | 5/1991 | Baude et al. |
| 5,027,001 A | 6/1991 | Torbert |

(Continued)

*Primary Examiner* — Alison Slater
(74) *Attorney, Agent, or Firm* — Honigman LLP

(57) ABSTRACT

A vision system of a vehicle includes a camera module disposed at the vehicle windshield and having a camera, a control and a recording device. The system includes a continuous loop recording of image data captured by the camera while the vehicle is operated. The control includes an image processor that processes image data captured by the camera for at least one driver assistance system of the vehicle. Responsive to a user input, the control exits the continuous loop recording and the recording device saves image data captured by the camera in non-volatile memory of the recording device. Responsive to the user input, the recording device saves in the non-volatile memory captured image data saved by the continuous loop recording prior to the user input and saves in the non-volatile memory image data captured by the camera after the user input.

20 Claims, 3 Drawing Sheets

(56) References Cited

U.S. PATENT DOCUMENTS

| | | |
|---|---|---|
| 5,027,200 A | 6/1991 | Petrossian et al. |
| 5,059,877 A | 10/1991 | Teder |
| 5,086,253 A | 2/1992 | Lawler |
| 5,096,287 A | 3/1992 | Kakinami et al. |
| 5,097,362 A | 3/1992 | Lynas |
| 5,121,200 A | 6/1992 | Choi |
| 5,130,709 A | 7/1992 | Toyama et al. |
| 5,170,374 A | 12/1992 | Shimohigashi et al. |
| 5,172,235 A | 12/1992 | Wilm et al. |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,204,778 A | 4/1993 | Bechtel |
| 5,208,701 A | 5/1993 | Maeda |
| 5,245,422 A | 9/1993 | Borcherts et al. |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,307,136 A | 4/1994 | Saneyoshi |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,410,346 A | 4/1995 | Saneyoshi et al. |
| 5,414,257 A | 5/1995 | Stanton |
| 5,414,461 A | 5/1995 | Kishi et al. |
| 5,416,478 A | 5/1995 | Morinaga |
| 5,424,952 A | 6/1995 | Asayama |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,461,357 A | 10/1995 | Yoshioka et al. |
| 5,469,298 A | 11/1995 | Suman et al. |
| 5,471,515 A | 11/1995 | Fossum et al. |
| 5,475,494 A | 12/1995 | Nishida et al. |
| 5,498,866 A | 3/1996 | Bendicks et al. |
| 5,500,766 A | 3/1996 | Stonecypher |
| 5,510,983 A | 4/1996 | Iino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,555,555 A | 9/1996 | Sato et al. |
| 5,568,027 A | 10/1996 | Teder |
| 5,574,443 A | 11/1996 | Hsieh |
| 5,581,464 A | 12/1996 | Woll et al. |
| 5,614,788 A | 3/1997 | Mullins |
| 5,634,709 A | 6/1997 | Iwama |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,670,935 A | 9/1997 | Schofield et al. |
| 5,677,851 A | 10/1997 | Kingdon et al. |
| 5,699,044 A | 12/1997 | Van Lente et al. |
| 5,724,316 A | 3/1998 | Brunts |
| 5,732,379 A | 3/1998 | Eckert et al. |
| 5,737,226 A | 4/1998 | Olson et al. |
| 5,760,828 A | 6/1998 | Cortes |
| 5,760,931 A | 6/1998 | Saburi et al. |
| 5,761,094 A | 6/1998 | Olson et al. |
| 5,765,116 A | 6/1998 | Wilson-Jones et al. |
| 5,765,118 A | 6/1998 | Fukatani |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,357 A | 3/1999 | Sivashankar et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,915,800 A | 6/1999 | Hiwatashi et al. |
| 5,923,027 A | 7/1999 | Stam et al. |
| 5,924,212 A | 7/1999 | Domanski |
| 5,959,555 A | 9/1999 | Furuta |
| 5,963,247 A | 10/1999 | Banitt |
| 5,990,469 A | 11/1999 | Bechtel et al. |
| 5,990,649 A | 11/1999 | Nagao et al. |
| 6,020,704 A | 2/2000 | Buschur |
| 6,049,171 A | 4/2000 | Stam et al. |
| 6,066,933 A | 5/2000 | Ponziana |
| 6,084,519 A | 7/2000 | Coulling et al. |
| 6,097,024 A | 8/2000 | Stam et al. |
| 6,100,799 A | 8/2000 | Fenk |
| 6,144,022 A | 11/2000 | Tenenbaum et al. |
| 6,175,300 B1 | 1/2001 | Kendrick |
| 6,223,114 B1 | 4/2001 | Boros et al. |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,297,781 B1 | 10/2001 | Turnbull et al. |
| 6,310,611 B1 | 10/2001 | Caldwell |
| 6,317,057 B1 | 11/2001 | Lee |
| 6,320,282 B1 | 11/2001 | Caldwell |
| 6,333,759 B1 | 12/2001 | Mazzilli |
| 6,370,329 B1 | 4/2002 | Teuchert |
| 6,392,315 B1 | 5/2002 | Jones et al. |
| 6,396,397 B1 | 5/2002 | Bos et al. |
| 6,411,204 B1 | 6/2002 | Bloomfield et al. |
| 6,424,273 B1 | 7/2002 | Gutta et al. |
| 6,430,303 B1 | 8/2002 | Naoi et al. |
| 6,442,465 B2 | 8/2002 | Breed et al. |
| 6,477,464 B2 | 11/2002 | McCarthy et al. |
| 6,497,503 B1 | 12/2002 | Dassanayake et al. |
| 6,534,884 B2 | 3/2003 | Marcus et al. |
| 6,539,306 B2 | 3/2003 | Turnbull |
| 6,553,130 B1 | 4/2003 | Lemelson et al. |
| 6,594,583 B2 | 7/2003 | Ogura et al. |
| 6,611,610 B1 | 8/2003 | Stam et al. |
| 6,636,258 B2 | 10/2003 | Strumolo |
| 6,672,731 B2 | 1/2004 | Schnell et al. |
| 6,690,268 B2 | 2/2004 | Schofield et al. |
| 6,693,517 B2 | 2/2004 | McCarthy et al. |
| 6,704,621 B1 | 3/2004 | Stein et al. |
| 6,711,474 B1 | 3/2004 | Treyz et al. |

(56) References Cited

U.S. PATENT DOCUMENTS

| | | |
|---|---|---|
| 6,735,506 B2 | 5/2004 | Breed et al. |
| 6,744,353 B2 | 6/2004 | Sjönell |
| 6,795,221 B1 | 9/2004 | Urey |
| 6,806,452 B2 | 10/2004 | Bos et al. |
| 6,819,231 B2 | 11/2004 | Berberich et al. |
| 6,823,241 B2 | 11/2004 | Shirato et al. |
| 6,824,281 B2 | 11/2004 | Schofield et al. |
| 6,850,156 B2 | 2/2005 | Bloomfield et al. |
| 6,889,161 B2 | 5/2005 | Winner et al. |
| 6,909,753 B2 | 6/2005 | Meehan et al. |
| 6,975,775 B2 | 12/2005 | Rykowski et al. |
| 6,989,736 B2 | 1/2006 | Berberich et al. |
| 7,038,577 B2 | 5/2006 | Pawlicki et al. |
| 7,062,300 B1 | 6/2006 | Kim |
| 7,065,432 B2 | 6/2006 | Moisel et al. |
| 7,079,017 B2 | 7/2006 | Lang et al. |
| 7,085,637 B2 | 8/2006 | Breed et al. |
| 7,092,548 B2 | 8/2006 | Laumeyer et al. |
| 7,111,968 B2 | 9/2006 | Bauer et al. |
| 7,116,246 B2 | 10/2006 | Winter et al. |
| 7,136,753 B2 | 11/2006 | Samukawa et al. |
| 7,145,519 B2 | 12/2006 | Takahashi et al. |
| 7,149,613 B2 | 12/2006 | Stam et al. |
| 7,161,616 B1 | 1/2007 | Okamoto et al. |
| 7,202,776 B2 | 4/2007 | Breed |
| 7,227,611 B2 | 6/2007 | Hull et al. |
| 7,365,769 B1 | 4/2008 | Mager |
| 7,460,951 B2 | 12/2008 | Altan |
| 7,490,007 B2 | 2/2009 | Taylor et al. |
| 7,580,795 B2 | 8/2009 | McCarthy et al. |
| 7,592,928 B2 | 9/2009 | Chinomi et al. |
| 7,639,149 B2 | 12/2009 | Katoh |
| 7,681,960 B2 | 3/2010 | Wanke et al. |
| 7,720,580 B2 | 5/2010 | Higgins-Luthman |
| 7,724,962 B2 | 5/2010 | Zhu et al. |
| 7,855,755 B2 | 12/2010 | Weller et al. |
| 7,881,496 B2 | 2/2011 | Camilleri et al. |
| 7,952,490 B2 | 5/2011 | Fechner et al. |
| 8,013,780 B2 | 9/2011 | Lynam et al. |
| 8,027,029 B2 | 9/2011 | Lu et al. |
| 8,258,932 B2 | 9/2012 | Wahlstrom |
| 8,849,495 B2 | 9/2014 | Chundrlik, Jr. et al. |
| 2002/0015153 A1 | 2/2002 | Downs |
| 2002/0113873 A1 | 8/2002 | Williams |
| 2003/0137586 A1 | 7/2003 | Lewellen |
| 2003/0222982 A1 | 12/2003 | Hamdan et al. |
| 2004/0016870 A1 | 1/2004 | Pawlicki et al. |
| 2004/0114381 A1 | 6/2004 | Salmeen et al. |
| 2004/0212678 A1 | 10/2004 | Cooper et al. |
| 2006/0018511 A1 | 1/2006 | Stam et al. |
| 2006/0018512 A1 | 1/2006 | Stam et al. |
| 2006/0091813 A1 | 5/2006 | Stam et al. |
| 2006/0103727 A1 | 5/2006 | Tseng |
| 2006/0164221 A1 | 7/2006 | Jensen |
| 2006/0250501 A1 | 11/2006 | Wildmann et al. |
| 2006/0290479 A1 | 12/2006 | Akatsuka et al. |
| 2007/0104476 A1 | 5/2007 | Yasutomi et al. |
| 2009/0093938 A1 | 4/2009 | Isaji et al. |
| 2009/0113509 A1 | 4/2009 | Tseng et al. |
| 2009/0177347 A1 | 7/2009 | Breuer et al. |
| 2009/0265069 A1 | 10/2009 | Desbrunes |
| 2010/0198513 A1 | 8/2010 | Zeng et al. |
| 2010/0228437 A1 | 9/2010 | Hanzawa et al. |
| 2010/0265344 A1 | 10/2010 | Verlarde et al. |
| 2011/0148609 A1 | 6/2011 | Dabholkar et al. |
| 2012/0044066 A1 | 2/2012 | Mauderer et al. |
| 2012/0062743 A1 | 3/2012 | Lynam et al. |
| 2012/0105635 A1 | 5/2012 | Erhardt et al. |
| 2012/0218412 A1 | 8/2012 | Dellantoni et al. |
| 2012/0262340 A1 | 10/2012 | Hassan et al. |
| 2012/0268601 A1 | 10/2012 | Yeh et al. |
| 2012/0307050 A1* | 12/2012 | Mimar .............. G08B 13/19676 348/143 |
| 2013/0124052 A1 | 5/2013 | Hahne |
| 2013/0129150 A1 | 5/2013 | Saito |
| 2013/0131918 A1 | 5/2013 | Hahne |
| 2013/0141597 A1 | 6/2013 | Lee et al. |
| 2013/0222592 A1 | 8/2013 | Gieseke |
| 2014/0049646 A1* | 2/2014 | Nix ..................... B60W 50/14 348/148 |
| 2014/0067206 A1 | 3/2014 | Pflug |
| 2014/0156157 A1 | 6/2014 | Johnson et al. |
| 2014/0192206 A1 | 7/2014 | Holz |
| 2014/0207344 A1 | 7/2014 | Ihlenburg et al. |
| 2014/0218529 A1 | 8/2014 | Mahmoud et al. |
| 2014/0222280 A1 | 8/2014 | Salomonsson |
| 2014/0313339 A1 | 10/2014 | Diessner et al. |
| 2014/0375446 A1* | 12/2014 | Wanami ............... G07C 5/0891 340/436 |
| 2014/0375476 A1 | 12/2014 | Johnson et al. |
| 2014/0379233 A1 | 12/2014 | Chundrlik, Jr. et al. |
| 2015/0009010 A1 | 1/2015 | Biemer |
| 2015/0087949 A1* | 3/2015 | Felix .................. A61B 5/04087 600/382 |
| 2015/0124096 A1 | 5/2015 | Koravadi |
| 2015/0158499 A1 | 6/2015 | Koravadi |
| 2015/0251599 A1 | 9/2015 | Koravadi |
| 2015/0352953 A1 | 12/2015 | Koravadi |
| 2016/0036917 A1 | 2/2016 | Koravadi et al. |
| 2016/0210853 A1 | 7/2016 | Koravadi |
| 2018/0299289 A1* | 10/2018 | Hill ....................... H04W 4/024 |

* cited by examiner

VEHICLE VISION SYSTEM WITH INCIDENT RECORDING FUNCTION

CROSS REFERENCE TO RELATED APPLICATIONS

The present application claims the filing benefits of U.S. provisional applications, Ser. No. 62/241,446, filed Oct. 14, 2015, Ser. No. 62/240,773, filed Oct. 13, 2015, and Ser. No. 62/158,140, filed May 7, 2015, which are hereby incorporated herein by reference in their entireties.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a vision system or imaging system for a vehicle that utilizes one or more camera modules or cameras (preferably one or more CMOS cameras) to capture image data representative of images exterior of the vehicle, including a camera module configured for attachment at a windshield of a vehicle equipped with the vision system. The camera module comprises a camera, a control and a recording device. When the camera module is disposed at the windshield of the vehicle, the camera views through the windshield and forward of the equipped vehicle. Responsive to a user input or a triggering event, the control controls the recording device to record and save image data captured by the camera. The saved image data includes image data captured by the camera after the user input or triggering event and includes previously saved captured image data that was previously saved via a continuous loop recording of image data captured by the camera during operation of the vehicle.

Optionally, the control controls the recording device responsive to a user input, and the user input comprises at least one of (i) a voice command from an occupant of the vehicle, (ii) a button or switch and (iii) actuation of a hazard light of the equipped vehicle. Optionally, the control controls the recording device responsive to a triggering event, and the triggering event comprises at least one of (i) a forward collision warning event, (ii) a lane departure warning event, (iii) an automatic emergency braking event, (iv) an airbag deployment, (v) a sudden or rapid deceleration, (vi) an antilock braking system event, (vii) a hard driver steering or threshold lateral g level event, (viii) a traction control event, (ix) a stability control event, (x) a wide open throttle event and (xi) a very high speed blind spot/lane change aid signal.

Optionally, the recording device records and saves image data for a period of time after the recording starts. The period of time may vary depending on the type of user input or triggering event. Optionally, the recording device saves previously recorded image data that was recorded for a period of time before the user input or triggering event. The period of time before the user input may vary depending on the type of user input or triggering event.

Therefore, the vision system of the present invention provides a forward viewing camera module that includes a camera and a recording device. The recording device records and saves image data captured by the camera to record and save video images of an incident or event. The recording device may record image data when the vehicle is being operated, and may record over or overwrite previously recorded image data unless the previously recorded data has been saved for future review or processing. The recording and saving function is done responsive to a user input or a triggering event, such that captured image data that is desired to be saved is saved when the operator selects the record and save function or when a particular event or incident occurs that automatically triggers the record and save function.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
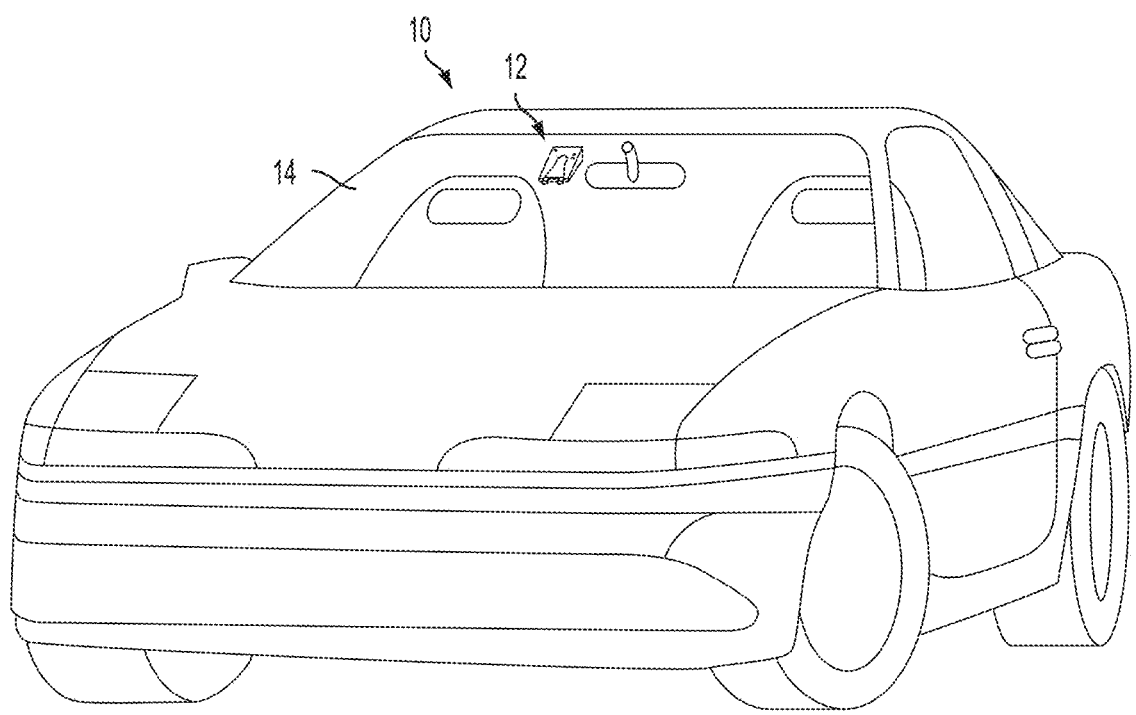
FIG. 1 is a plan view of a vehicle with a vision system that incorporates cameras in accordance with the present invention.
Figure 2:
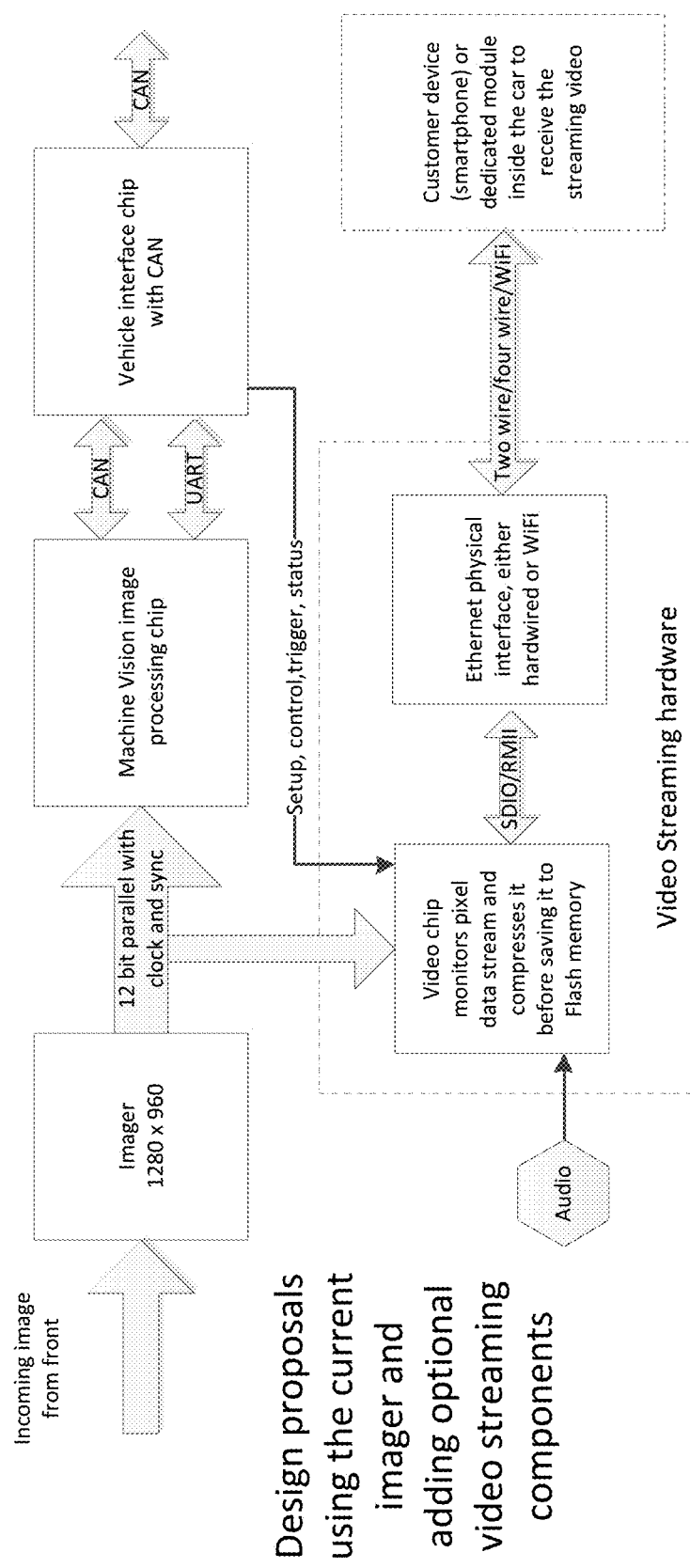
FIG. 2 is a schematic of an incident recording system of the present invention.
Figure 3:
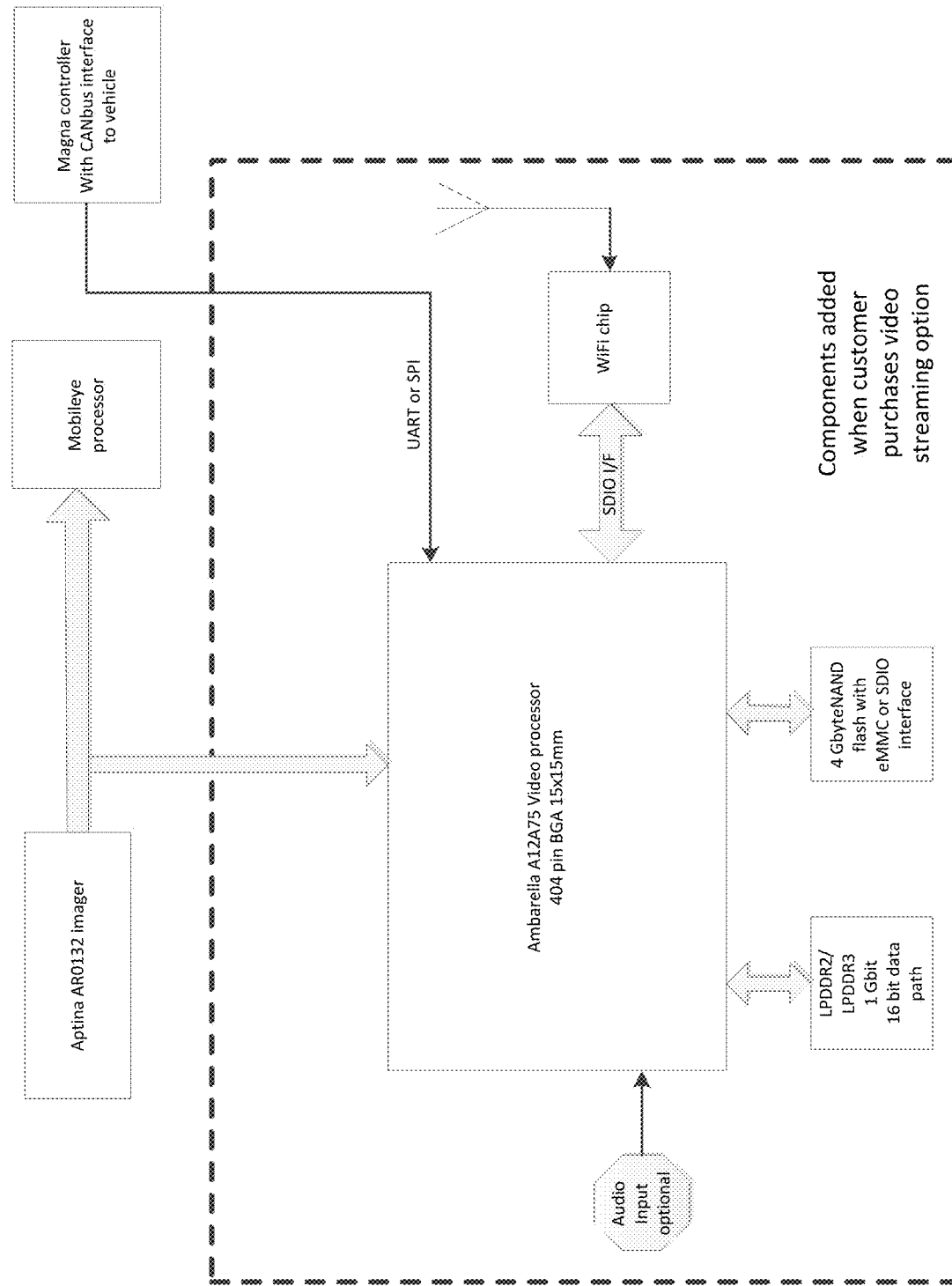
FIG. 3 is a schematic of another incident recording system of the present invention.

Referring now to the drawings and the illustrative embodiments depicted therein, a vehicle 10 includes an imaging system or vision system that includes a forward viewing camera module 12 that is disposed at and views through the windshield 14 of the vehicle and captures image data of the scene exterior and forward of the vehicle (FIG. 1). The camera module includes a lens for focusing images at or onto an imaging array or imaging plane or imager of the camera. The forward viewing camera views through the windshield and forward of the vehicle, such as for a machine vision system (such as for traffic sign recognition, headlamp control, pedestrian detection, collision avoidance, lane marker detection and/or the like). The vision system includes a control or electronic control unit (ECU) or processor that is operable to process image data captured by the camera or cameras and may detect objects or the like and/or provide displayed images at a display device for viewing by the driver of the vehicle. The data transfer or signal communication from the camera to the ECU may comprise any suitable data or communication link, such as a vehicle network bus or the like of the equipped vehicle.

The camera system or camera module of the present invention may utilize aspects of the systems and/or modules described in International Publication Nos. WO 2013/123161 and/or WO 2013/019795, and/or U.S. Pat. Nos. 8,256,821; 7,480,149; 7,289,037; 7,004,593; 6,824,281; 6,690,268; 6,445,287; 6,428,172; 6,420,975; 6,326,613; 6,278,377; 6,243,003; 6,250,148; 6,172,613 and/or 6,087,953, and/or U.S. Publication Nos. US-2014-0226012 and/or US-2009-0295181, and/or U.S. Publication No. US-2015-0327398, which are all hereby incorporated herein by reference in their entireties. Optionally, the vision system may include a plurality of exterior facing imaging sensors or cameras, such as a rearward facing imaging sensor or camera, a forwardly facing camera at the front of the vehicle, and sidewardly/rearwardly facing cameras at respective sides of the vehicle, which capture image data representative of the scene exterior of the vehicle.

The system of the present invention includes a recording device (that may be part of the camera module or may be separate from the camera module) that is operable to record video image data captured by one or more of the cameras, such as responsive to an incident or triggering event. The recording feature or incident recorder may record image data captured by the forward viewing front camera and/or other cameras of the vehicle. The recording device may be a physical addition to the camera module itself that would capture videos as they pass from the camera to the image processor. The vision system and recording system may utilize aspects of the systems described in U.S. Publication No. US-2014-0218529, which is hereby incorporated herein by reference in its entirety.

The captured image data is written into a ring buffer and then stored in non-volatile memory in the case of an incident. Drivers can download or erase these videos through an interface such as the radio head unit, multimedia center, instrument cluster menus, or even a direct connection between their personal device and the recorder, such as via a BLUETOOTH® link or Wi-Fi or the like. For example, the communication may use the Wi-Fi_33 connection.

The recorder of the present invention thus uses the advanced driver assist system (ADAS) front camera that is already designed into the vehicle (such as for use in automatic or intelligent headlamp control, lane keep assist, lane departure warning, traffic sign recognition and/or the like) and can write endlessly to RAM and then save incidents to non-volatile memory, thus saving the non-volatile memory from too many writes so it can last the life of the vehicle. The recording device may be operable responsive to an incident or may be manually activated to start and stop recording.

For example, the recording device (such as via the control or processor) may be actuated responsive to a user input (such as a button or switch or) or responsive to detection of an incident or triggering event occurring at or near the vehicle. Optionally, the recording device or control may be actuated responsive to a voice signal captured by a microphone of the system, such as a spoken word or words such as "record that" or the like. Optionally, the microphone may be disposed in a smart phone or cell phone or the like. Many vehicle infotainment systems now have microphones to handle hands-free calling too, whereby the microphone of those systems may interface with the recording system.

Thus, the system may be responsive to a microphone input, and this may be a Controller Area Network (CAN) input for a remote trigger. With such a configuration, a voice request may be received by a microphone at a mirror head unit or instrument cluster, whereby the request or voice command can be sent via a CAN message or signal to the recording system to capture images. In such an application, the recording system would not require its own microphone, yet could be responsive to vocal commands.

Optionally, the recording device or system may record audio while recording and saving captured image data in the non-volatile memory. For example, the driver may give a voice command to start a recording and then may narrate or provide other spoken or audio messages (or play music through the radio), whereby the recording device records the captured image data and the vocal or audio sounds from in the vehicle cabin, such that when the captured and saved image data file (saved by the recording device in non-volatile memory) includes image and sound information. Optionally, the recording device or system may record other audio signals, such as sounds exterior of the vehicle, depending on the particular application and user input and/or triggering event. For example, a user of the system may give a command to record exterior sound or the system may automatically record exterior sound and/or interior sound responsive to a collision or impact of the vehicle.

The system may continuously record captured image data, such as at a continuous loop recording of at least 20 seconds, preferably at least 30 seconds or more, where the system continuously records over previously recorded image data (recorded, for example, 20 seconds earlier or 30 seconds earlier or the like). The system thus continuously operates to temporarily record captured image data when the vehicle is being operated. The user input or triggering event of the recording system of the present invention overrides the continuous loop recording and records and saves captured image data as a separate data file (that is not part of the continuous loop recording) for the duration of a recording period of time. When the user actuated recording has stopped (such as due to a period of time elapsing after actuation or due to a second user input), the continuous loop recording continues while the vehicle is being operated.

Optionally, the recording device may record data responsive to a user input such as flashing the hazard warning lights (which may be picked up via a controller area network (CAN) or the like), which provides for a manual recording and storage operation of the system. Optionally, a user may trigger a recording by pressing an existing user input of the vehicle (such as by pressing a vehicle button multiple times), whereby such pressing generates a signal that is communicated (such as via a CAN bus or network of the vehicle) to the recording system. For example, a user may trigger the recording by pressing the hazard flasher button twice in a row (such as one second apart or the like), such as by pushing it once to turn on the hazard lamp, then pushing it again to turn off the hazard lamp one second (or less) later. The hazard operation may be communicated via a CAN signal, so the recording system may be responsive to such a CAN signal indicative of such a user actuation. Optionally, a patterned actuation or pressing of another user input of the vehicle may also or otherwise generate a triggering signal to the recording system.

Optionally, the recording device may record data responsive to a triggering event, such as a sudden deceleration of the vehicle or the like, such that when something happens (such as a small accident or the like) the system will immediately start recording image data to capture the incident. Optionally, other triggers may start the recording feature. For example, the recording device may be activated to record data responsive to a forward collision warning system (to begin recording data before, during and after a collision or near collision), a lane departure warning system, an automatic emergency braking system, an airbag deployment, a sudden or rapid deceleration, such as hard driver braking (such as at 0.4 gs or more), an antilock braking system event, a hard driver steering or threshold lateral g level, a traction control event, a stability control event, a wide open throttle event, and/or a very high speed blind spot/lane change aid signal (such as when an equipped vehicle is passed by another vehicle at a high relative speed, such as at least about 50 kph relative speed, or 100 kph relative or delta speed or more).

Once activated, the recording device may record data through the incident or for a period of time following the triggering event or input. For example, the system may quickly (maybe after only about two seconds) stop recording and start saving after an airbag deployment. Optionally, the system may start recording and continue recording for some duration to capture a passing car, and then save the captured data. For a stability control event, the system may record data for about 10 seconds before (as already temporarily recorded in the continuous loop recording) and 10 seconds after (or 10 seconds before and record until the vehicle has stopped/stabilized) and then save the captured data. When hazard lights are actuated, the system may record for a long duration such as about 30 seconds before (as already temporarily recorded in the continuous loop recording) and about 30 seconds after the triggering event. For a vocal input, the system may start and stop the recording device responsive to the user's voice, or may use the voice signal only as the trigger and treat it like the flashers and record for a period of time before the signal and for a period of time after the signal.

Optionally, for a situation when a pedestrian lays down in front of a vehicle and claims that the driver hit them, the system may provide a way to save the captured data that was captured before the driver thought to record the data (such as the data that was already temporarily recorded in the continuous loop recording). For example, if the driver triggers the recording, the recording may save about 30 seconds (or more) of data captured before the triggering and may continue to save captured image data for a period of time following the driver's triggering, thereby saving captured image data that encompasses substantially the entire event. Thus, the system provides the driver more time to see what happened, understand what is going on, and then think about recording the event or incident.

Optionally, when at the likes of a race track or when the vehicle is driven along the likes of "scenic routes", the driver may want to capture images of the race or of the scenery, and the system thus may allow the driver to push "start recording" and then have it record some fixed amount of time automatically. The triggering or "start" may come from a multimedia center. The system may indicate to the driver that it is recording and saving video so that the driver does not turn off the vehicle until the file is saved. Optionally, the recording device may remain activated and may run on battery power until the system is done saving the data.

The system thus may record video images or image data (and optionally other vehicle information or the like) to record an incident or event. The recorded data is saved for later review or processing, and may be saved for a period of time following the recording event or until the user manually deletes the recording. The recorded data may be downloaded to a smart phone or server or the like, such as via a Wi-Fi link or vehicle to infrastructure (v2x) communication or the like. For vehicles with Wi-Fi, the recorded data can be downloaded to the vehicle owner's home computer while interfacing with the vehicle when it is parked at the owner's home. For example, if the Wi-Fi of the vehicle remains active even when the vehicle is shut down, the owner can link to the vehicle's Wi-Fi connection (such as via Ethernet connection between the vehicle control and the owner's router at home) to access and download the recorded data from the vehicle.

With such a Wi-Fi connection (or other communication between a home computer or system and the vehicle), the vehicle user or owner may also or otherwise download the latest trip data (such as fuel consumption, mileage, etc.) when he or she arrives at home or at the office or the like. Optionally, a Marvell chip can do both normal Wi-Fi (a-n) and 802.11 P (V2V) and the like, and the system may also utilize the 802.11 P communication to pay road tolls. Optionally, the recorded data can be communicated via a wireless communication to a remote server or the like, or the recorded data can be saved to a portable data storage device, such as an SD card or the like, for later review and processing.

Therefore, the present invention provides an incident recording feature that includes the recording device as part of the forward viewing camera module. The recording device records image data captured by the camera, and may commence recording responsive to a user input or command and/or responsive to a triggering event. Depending on the input or event, the system may record and save image data for a particular period of time following the input or event (and optionally may save image data recorded for a particular period of time before the input or event so that the recording includes earlier image data for situations where the earlier information may be desired). The saved recorded data can be downloaded to a remote server or to the vehicle owner's computer or smart phone or the like, such as via a wireless communication or Wi-Fi link, such as when the vehicle is parked at the user's home or office.

As the Dash Cam becomes a more popular aftermarket option, OEMs are looking for ways to provide this feature as an option to their customers. The basic requirement for such a system is to be able to save a short video clip a short time before and after a "trigger event", so that it can be recovered and played back later. The trigger event can be a user request (such as via a user input or button or switch or a user voice request or the like), or a vehicle generated trigger, such as activation of an automatic emergency braking (AEB) system command by the forward camera module (FCM), or even an airbag deployment. Optionally, the trigger may comprise a remote trigger (such as from a remote source, such as a user's smart phone or the like or such as from a car2car or v2v or v2x communication system or the like), where the signal is received and provided to the controller or processor via a CAN input of the vehicle.

The length of recording time will depend on the triggering event. For example, for vehicle triggers (AEB message, airbag deployed message, etc.), 15 seconds before and 5 seconds after the trigger may be written to the flash memory. Optionally, for user request activated triggers, the recording time may be 60 seconds before and 60 seconds after the trigger. Optionally, the user can extend the recording time, such as one extension of about two minutes, by making the request a second time while the first recording is still in progress. Each event may be saved in a file with a name created that includes the date and time as part of the file name. Up to 10 to 15 such files may be stored in flash memory at any time, and if memory reaches full, the oldest files will be deleted first.

From a cost stand point, using the same imager/lens for both machine vision and video streaming has the lowest cost (no additional lens and imager required). However, this has some disadvantages, such as lower resolution and lack of color. If a 1280×960 resolution is acceptable, and the users are willing to accept the output of "colorization" algorithms, this becomes a viable solution.

The video streaming strategy should be designed to work across all camera (such as an Aptina megapixel based Gen 3 camera platform or the like) hardware variations. Possible platforms include the BOLERO based ECU(s), and the proposed CALYPSO based ECUs for General Motors Corporation (GM). The same strategy may work in portrait or landscape versions.

As far as possible, the video streaming option should require minimal redesign to the current CHRYSLER/MAZDA FCM ECU board designs. The external package for the FCM with the video streaming may be slightly larger, but should still fit inside the same bracket and within the space available in the target vehicle. Optionally, the design should protect for receiving a camera input from a surround view camera system with minimal modifications.

The additional hardware will require power from the vehicle, such as about 3.3 volts, at 150 mA, and may need to be able to operate in a temperature range of about −40 degrees C. to about +85 degrees C.

The video streaming section may be considered a non-critical function and can be switched off at about 75 degrees C. to reduce the total camera module internal self-heating. This reduction in internal power dissipation will help allow the rest of the critical electronics running up to about 85 degrees C. In the case where the video streaming board is simply powered off the imager 3.3 volt supply, this early switch-off may not take place, so the components will have to operate from −40 degrees C. to +85 degrees C.

The system may include a WIFI antenna, which may be designed to operate at 5.0 GHz (this limitation might help with BLUETOOTH conflicts on 2.4 GHz). There may be a provision to permit WIFI video streaming transmissions to be transmitted and received from the camera module. In the event a special lower cover is needed for the video streaming module, this cover may be designed to accommodate this. Note that any effect on overall module EMC (electromagnetic control) should be considered.

Optionally, the system may receive audio, such as from a microphone. Most vehicles will have microphones already available for hands-free phone or VR, and this audio signal may be brought into the FCM module. Optionally, a small microphone may be added into the FCM with small openings in the lower cover. While this microphone location is not optimal, the microphone should be capable of collecting acceptable audio signals.

In the event new application software is required, the bootloader design should permit a complete SW reflash over the CAN bus through the universal asynchronous receiver/transmitter (UART) communications port.

The interface connections with the rest of the camera module may include video input lines, such as video lines comprising 12 bit parallel data and a pixel clock (13 signals total). The logic level voltage may be about 1.8 volts.

A UART serial connection may provide a full duplex connection with a spare port on the control processor (TX, RX, two signals total). The logic level voltage may be about 3.3 volts.

Optionally, a single active low control line may be provided to allow the microcontroller to reset the EDR video processor. The logic level voltage may be about 3.3 volts.

Optionally, an antenna connection may be provided as needed for the WIFI RF output. This may be considered as part of the Event Data Recorder (EDR) subsystem.

The system may operate at about 1.8 volts power at 150 mA (such as for an AMBARELLA EDR processor or the like), with 3.3 volts for I.O. rails to the microcontroller. Power at about 1.8 volts at 10 mA may be provided for the WIFI chip in low power beacon only mode.

On initial power up, the processor will boot from the flash, run its self-test initialization, and wait for a UART command with its initialization parameter values before proceeding to video buffering mode. On receiving the UART command, the module will turn on the external WiFi host, and begin to continuously save video frames in a small circular buffer in DDR. Optionally, and desirably, the system may reduce the number of writes to flash, since the unit life expectancy should be at least about 15 years, and continuously writing to the flash will reduce its life expectancy.

In the typical scenario, the video will already be processed by a "colorization" algorithm to convert the RCCC into a pseudo color image. The video should also be compressed using a popular industry standard compression format such as H.264/MPEG4 or H.265.

The WiFi link will be available for pairing an external WiFi client. Once the module is paired, streaming video will be available over the WiFi link to the user as well, so the external paired module (such as a smart phone or tablet or infotainment system or the like) will also be able to see and save the video as well. An HMI available on the vehicle (radio or cluster) will allow the pairing password to be changed to something other than the factory default. In the event the password is "lost" the factory default password may be restored by a battery disconnect.

If the module receives a trigger to save video, all the video in the circular buffer, as well as a small amount of post-trigger video, will be written to a time/date coded file in flash memory. The WiFi link will allow a user interface to copy files off the internal flash to an external paired device.

On power-up, and also after each event write to flash is completed, the processor may check for free memory available in the flash. If there is insufficient memory available to write at least 240 seconds of video, the oldest file(s) in flash memory can be deleted to free up the minimum required space.

Because the forward camera module is a safety module and also needs to meet the security needs of all OEMs, the Event Data Recorder (EDR) option will be provided in such a way that the original functionality of the camera module shall not be compromised by any EDR component failure, or deliberate attempt by a hacker to access the camera components through the EDR WiFi link. The following possible use cases shall be protected for in the EDR architecture:

a) Failure of the EDR module to boot up and run. If the processor and software fail its startup diagnostics due to hardware (HW) failure, the EDR module connections may default in such a way as to not prevent the main camera functionality. Therefore if the processor is not operating correctly, the twelve parallel imager inputs, pixel-clock, and UART connection lines should all be forced to go tri-state, or remain as inputs only.

b) If the camera module microcontroller determines that the EDR functionality is suspect or not needed, it can choose to remove power from the processor and its associated components. If this is done, all connections between the processor and pixel data lines and pixel clock shall go to tri-state mode.

c) In the event that the software (SW) on the processor is hacked through the WiFi link, since the camera pixel input cannot be forced to be outputs, the only vulnerability to the rest of the camera system will be through the UART connection. Therefore, the UART connection and protocol shall be designed in such a way that the malicious SW cannot influence the rest of the camera module functionality. In the event the processor floods the UART with continuous messages, the microcontroller can just remove power and set the required DTC.

The UART link concept may permit complete isolation of the safety critical operating components from the video recording section. Therefore, there may be no control commands permitted to be sent from the EDR components to the main microcontroller. All messaging will follow a master/slave format except for the 1 second heartbeat status message. In the event a failure occurs that causes the module to flood the UART with continuous UART transmissions, the microcontroller will detect this and disable the UART port and report this as EDR module failure.

The software is able to report the following error codes and status bits in the heartbeat message, sent once per second to the microcontroller:

Success/failure to pass internal self-tests (DDR, flash, initialization of WiFi);

SW error;

Image is coming in from camera (pixel clock is running);

If WiFi is operating, and channel number;

External device successfully paired on WiFi;

An event has been triggered and the video is being saved to flash;

Memory is full, and previous recordings are being deleted.

Examples of UART commands from the processor to the EDR processor include:

UART initial setup message, which will contain:

the WiFi node broadcast name (24 ASCII characters max, trailing blanks will be deleted), the WiFi MAC address allocated to it at the factory end-of-line (EOL) tester by a calibration file, or the default MAC address, the current WiFi password (eight ASCII characters), may default to last 8 digits of the VIN, but such a simple default may encourage hackers, the minimum number bytes NVRAM free space to be available able to save the event trigger event data. In the event the processor realizes insufficient free space is available, the oldest files in memory may be deleted until sufficient free space is available.

UART record event trigger message, which will contain:

The amount of data to save is a predetermined number of seconds of data (maximum limited by RAM memory available) before the trigger, and another predetermined number of seconds after the trigger.

The file name to be used for this data save (up to 60 ASCII characters). Usually the file name will carry date and time information coded in the name.

As a special consideration, (and if available to the FCM on the vehicle bus), abbreviated GPS coordinates may also be included in the file name, or in the header of the file.

Some possible solutions include:

Components added to the FCM on the main board. This will require two versions of the camera module, one with EDR and one without. If the overall size of the module is not a critical factor, two versions of the same PCB could be built, one with de-populated EDR components.

Modification of the imager board to split up the signal into two parts, one going to the main FCM board, and the other to the video streaming board, or section of the main board. A method of connecting power and control may be added to the main board, as well as extra current capability in the power supplies.

A video streaming board that is in between the imager connector and the main FCM board, and passes the video through. This scheme may still need an additional connector between it and the main FCM board for power and control.

An extra connector may be added to the FCM main board, and will contain image signal pins and power and control pins. The video streaming board will plug onto this connector. The extra connector need only be populated for FCMs that need the option, however, all PCBs will need to give up this space permanently, and allow extra power supply headroom for this.

The system may communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or 4G or 5G) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. US-2014-0375476; US-2014-0218529; US-2013-0222592; US-2012-0218412; US-2012-0062743; US-2015-0251599; US-2015-0158499; US-2015-0124096; US-2015-0352953 and/or US-2016-0036917, and/or U.S. patent application Ser. No. 14/996,570, filed Jan. 15, 2016, which are hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EYEQ2 or EYEQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array (such as 1 to 2 MP) or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCCC (red, clear, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014; WO 2013/081984; WO 2013/081985; WO 2013/074604; WO 2013/086249; WO 2013/103548; WO 2013/109869; WO 2013/12316; WO 2013/126715; WO 2013/043661; WO 2013/158592 and/or WO 2014/204794, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Publication No. US-2012-0062743, which are hereby incorporated herein by reference in their entireties.

The imaging device and control and image processor and any associated illumination source, if applicable, may comprise any suitable components, and may utilize aspects of the cameras (such as various imaging sensors or imaging array sensors or cameras or the like, such as a CMOS imaging array sensor, a CCD sensor or other sensors or the like) and vision systems described in U.S. Pat. Nos. 5,760,962; 5,715,093; 6,922,292; 6,757,109; 6,717,610; 6,590,719; 6,201,642; 5,796,094; 6,559,435; 6,831,261; 6,822,563; 6,946,978; 7,720,580; 8,542,451; 7,965,336; 7,480,149; 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2009/036176; WO 2009/046268; WO 2010/099416; WO 2011/028686 and/or WO 2013/016409, and/or U.S. Pat. Publication Nos. US 2010-0020170 and/or US-2009-0244361, which are all hereby incorporated herein by reference in their entireties.

The camera module and circuit chip or board and imaging sensor may be implemented and operated in connection with various vehicular vision-based systems, and/or may be operable utilizing the principles of such other vehicular systems or driver assistance systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. Publication No. US-2012-0162427, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vision system for a vehicle, said vision system comprising:
    a camera module configured for attachment at an interior surface of a windshield of a vehicle equipped with said vision system, said camera module comprising a camera, a control and a recording device;
    wherein, when said camera module is disposed at the windshield of the equipped vehicle, said camera views through the windshield and forward of the equipped vehicle, and wherein said camera captures image data;
    wherein said vision system comprises a continuous loop recording of image data captured by said camera while the vehicle is operated, and wherein said vision system continuously records captured image data and erases previously captured image data such that image data captured by said camera for a time period is temporarily saved by said continuous loop recording;
    wherein said control comprises an image processor that processes image data captured by said camera for at least one driver assistance system of the vehicle;
    wherein, responsive to actuation of a user input, said control exits said continuous loop recording and said recording device saves image data captured by said camera in non-volatile memory of said recording device;
    wherein, responsive to actuation of the user input, said recording device saves in the non-volatile memory captured image data saved by said continuous loop recording prior to actuation of the user input and saves in the non-volatile memory image data captured by said camera after actuation of the user input; and
    wherein said recording device stops saving in the non-volatile memory image data captured by said camera responsive to the earlier of (a) a period of time elapsing following actuation of the user input and (b) actuation of a further user input.

2. The vision system of claim 1, wherein actuation of the user input comprises at least one of (i) actuation of a button or switch by an occupant of the vehicle, (ii) actuation of a hazard light of the equipped vehicle by an occupant of the vehicle and (iii) an input from a remote device actuated by a user.

3. The vision system of claim 1, wherein actuation of the user input comprises a voice command from an occupant of the vehicle.

4. The vision system of claim 3, wherein said camera module includes a microphone for receiving voice commands and messages.

5. The vision system of claim 1, wherein said control controls said recording device to save captured image data responsive to a triggering event, and wherein said triggering event comprises at least one of (i) a forward collision warning event, (ii) a lane departure warning event, (iii) an automatic emergency braking event, (iv) an airbag deployment, (v) a sudden or rapid deceleration, (vi) an antilock braking system event, (vii) a hard driver steering or threshold lateral g level event, (viii) a traction control event, (ix) a stability control event, (x) a wide open throttle event and (xi) a very high speed blind spot/lane change aid signal.

6. The vision system of claim 5, wherein said recording device saves in the non-volatile memory captured image data saved by said continuous loop recording for a period of time prior to actuation of the user input or said triggering event, and wherein the period of time prior to actuation of the user input or said triggering event varies depending on the type of user input or triggering event.

7. The vision system of claim 1, wherein said recording device stops saving in the non-volatile memory captured image data responsive to a further user input.

8. The vision system of claim 1, wherein said recording device stops saving in the non-volatile memory image data captured by said camera responsive to a period of time elapsing following actuation of the user input.

9. The vision system of claim 1, wherein said recording device stops saving captured image data responsive to another user input.

10. The vision system of claim 1, wherein said recording device saves in the non-volatile memory the captured image data that is saved by said continuous loop recording for a period of time prior to actuation of the user input, and wherein the period of time prior to actuation of the user input comprises at least a portion of the time period for a full loop of said continuous loop recording.

11. The vision system of claim 10, wherein the period of time prior to actuation of the user input varies depending on the type of user input.

12. The vision system of claim 1, wherein the captured image data saved by said continuous loop recording prior to actuation of the user input and the image data captured by said camera after actuation of the user input are saved as a single data file in the non-volatile memory of said recording device.

13. The vision system of claim 1, wherein said vision system is operable to communicate the saved captured image data to a remote device via a wireless communication.

14. The vision system of claim 1, wherein, at vehicle start up and at completion of a recording, said control determines available non-volatile memory for recording image data, and wherein, if determined available non-volatile memory is below a threshold level, said control deletes an oldest saved data file from the non-volatile memory of said recording device.

15. A vision system for a vehicle, said vision system comprising:

a camera module configured for attachment at an interior surface of a windshield of a vehicle equipped with said vision system, said camera module comprising a camera, a control and a recording device;

wherein, when said camera module is disposed at the windshield of the equipped vehicle, said camera views through the windshield and forward of the equipped vehicle, and wherein said camera captures image data;

wherein said vision system comprises a continuous loop recording of image data captured by said camera while the vehicle is operated, and wherein said vision system continuously records captured image data and erases previously captured image data such that image data captured by said camera for a time period is temporarily saved by said continuous loop recording;

wherein said control comprises an image processor that processes image data captured by said camera for at least one driver assistance system of the vehicle;

wherein, responsive to a user input, said control exits said continuous loop recording and said recording device saves image data captured by said camera in non-volatile memory of said recording device;

wherein said user input comprises at least a voice command from an occupant of the vehicle;

wherein said camera module includes a microphone for receiving voice messages, and wherein said recording device saves audio data with captured image data in the non-volatile memory;

wherein, responsive to said user input, said recording device saves in the non-volatile memory captured image data saved by said continuous loop recording prior to said user input and saves in the non-volatile memory image data captured by said camera and received audio data after said user input; and wherein at least one of (i) said recording device stops saving captured image data after a period of time following said user input and (ii) said recording device stops saving captured image data responsive to another user input.

16. The vision system of claim 15, wherein said recording device stops saving captured image data after a period of time following said user input, and wherein the period of time following said user input varies depending on the type of user input.

17. The vision system of claim 15, wherein the captured image data saved by said continuous loop recording prior to said user input and the image data captured by said camera after said user input are saved as a single data file in the non-volatile memory of said recording device.

18. A vision system for a vehicle, said vision system comprising:

a camera module configured for attachment at an interior surface of a windshield of a vehicle equipped with said vision system, said camera module comprising a camera, a control and a recording device;

wherein, when said camera module is disposed at the windshield of the equipped vehicle, said camera views through the windshield and forward of the equipped vehicle, and wherein said camera captures image data;

wherein said vision system comprises a continuous loop recording of image data captured by said camera while the vehicle is operated, and wherein said vision system continuously records captured image data and erases previously captured image data such that image data captured by said camera for a time period is temporarily saved by said continuous loop recording;

wherein said control comprises an image processor that processes image data captured by said camera for at least one driver assistance system of the vehicle;

wherein, responsive to a user input, said control exits said continuous loop recording and said recording device saves image data captured by said camera in non-volatile memory of said recording device;

wherein, irrespective of the user input and responsive to a triggering event, said control exits said continuous loop recording and said recording device saves image data captured by said camera in non-volatile memory of said recording device;

wherein, responsive to the user input or the triggering event, said recording device saves in the non-volatile memory captured image data saved by said continuous loop recording prior to the user input or the triggering event and saves in the non-volatile memory image data captured by said camera after the user input or the triggering event;

wherein the captured image data saved by said continuous loop recording prior to the user input or the triggering event and the image data captured by said camera after the user input or the triggering event are saved as a single data file in the non-volatile memory of said recording device; and wherein said recording device stops saving captured image data after a period of time following the user input or the triggering event.

19. The vision system of claim 18, wherein the period of time following user input or the triggering event varies depending on the type of the user input or the type of the triggering event.

20. The vision system of claim 18, wherein said recording device saves in the non-volatile memory the captured image data that is saved by said continuous loop recording for a period of time prior to the user input or the triggering event, and wherein the period of time prior to the user input or the triggering event comprises at least a portion of the time period for a full loop of said continuous loop recording, and wherein the period of time prior to the user input or the triggering event varies depending on the type of the user input or the type of the triggering event.

* * * * *

UNITED STATES PATENT AND TRADEMARK OFFICE
CERTIFICATE OF CORRECTION

| | |
|---|---|
| PATENT NO. | : 10,819,943 B2 |
| APPLICATION NO. | : 15/147300 |
| DATED | : October 27, 2020 |
| INVENTOR(S) | : Christopher L. Van Dan Elzen |

It is certified that error appears in the above-identified patent and that said Letters Patent is hereby corrected as shown below:

In the Specification

Column 11
Line 46, "WO 2013/12316" should be --WO 2013/123161--

Signed and Sealed this
Eighth Day of December, 2020

Andrei Iancu
*Director of the United States Patent and Trademark Office*